(12) United States Patent
Miller et al.

(10) Patent No.: US 11,909,771 B2
(45) Date of Patent: Feb. 20, 2024

(54) ROLE-BASED POLICY DNS RESPONSE FOR NETWORK SECURITY USER NOTIFICATIONS

(71) Applicant: Cisco Technology, Inc., San Jose, CA (US)

(72) Inventors: Darrin Joseph Miller, Marysville, OH (US); Kevin Patrick Regan, Farnham (GB); Einar Nilsen-Nygaard, Waterside Kilmarnock (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 242 days.

(21) Appl. No.: 16/889,102

(22) Filed: Jun. 1, 2020

(65) Prior Publication Data

US 2021/0377314 A1 Dec. 2, 2021

(51) Int. Cl.
*H04L 29/06* (2006.01)
*H04L 9/40* (2022.01)
*H04L 61/4511* (2022.01)
*H04L 61/5007* (2022.01)

(52) U.S. Cl.
CPC ........ *H04L 63/205* (2013.01); *H04L 61/4511* (2022.05); *H04L 61/5007* (2022.05); *H04L 63/102* (2013.01)

(58) Field of Classification Search
CPC ............... H04L 63/205; H04L 61/1511; H04L 61/2007; H04L 63/102
See application file for complete search history.

(56) References Cited

U.S. PATENT DOCUMENTS

| | | | |
|---|---|---|---|
| 9,794,229 B2 | 10/2017 | Yu et al. | |
| 9,813,285 B1* | 11/2017 | McGovern | G06F 21/316 |
| 2005/0257244 A1* | 11/2005 | Joly | G06F 21/604 726/1 |
| 2016/0072847 A1* | 3/2016 | Bremen | G06F 21/305 726/1 |
| 2017/0310709 A1* | 10/2017 | Foxhoven | H04L 63/10 |
| 2018/0205734 A1* | 7/2018 | Wing | H04L 63/20 |
| 2019/0081958 A1* | 3/2019 | Lee | H04L 63/0209 |

OTHER PUBLICATIONS

Omar Santos, "Using DNS RPZ to Block Malicious DNS Requests", Cisco Blog, Oct. 2, 2013, 6 pages.
N. Cam-Winget, Ed. et al., Request for Comments: 8600, "Using Extensible Messaging and Presence Protocol (XMPP) for Security Information Exchange", Internet Engineering Task Force (IETF), Jun. 2019, 28 pages.

* cited by examiner

*Primary Examiner* — Christopher B Robinson
(74) *Attorney, Agent, or Firm* — Edell, Shapiro & Finnan, LLC

(57) ABSTRACT

A Domain Name System (DNS) device stores data indicative of a user device and data indicative of a policy setting a level of access of the user device to a responding device. The DNS device receives, from the user device, a request for an Internet Protocol address of the responding device. The DNS device determines, based upon the request and the data indicative of the user device, that the policy applies to the request. The DNS device applies the policy in response to the determining.

20 Claims, 7 Drawing Sheets

ROLE-BASED POLICY DNS RESPONSE FOR NETWORK SECURITY USER NOTIFICATIONS

TECHNICAL FIELD

The present disclosure relates to the application of policies within computer networks.

BACKGROUND

Network security administrators may implement network security controls or policies using Access Control Lists (ACLs) and/or firewalls. According to some implementations, the enforcements points of the network controls and/or policies silently discard packets that violate the controls or policies, while other implementations utilize Internet Control Message Protocol (ICMP) techniques to indicate to administrators that the traffic was prohibited.

While administrators may be notified of the enforcement of network controls or policies through logging operations, end-users who fall within the management domain of the network security administrator's network, on the other hand, are not notified that their traffic was prohibited. This failure to notify may lead to end-user dissatisfaction and unnecessarily increased operational costs. That is, end-users may raise internal trouble tickets to address what they believe to be an issue within the network, when in reality the end-user's traffic was correctly and intentionally prohibited.

DESCRIPTION OF EXAMPLE EMBODIMENTS

Overview

According to example embodiments of the techniques of the present disclosure, a Domain Name System (DNS) device stores data indicative of a user device and data indicative of a policy setting a level of access of the user device to a responding device. The DNS device receives, from the user device, a request for an Internet Protocol (IP) address of the responding device. The DNS device determines, based upon the request and the data indicative of the user device, that the policy applies to the request. The DNS device applies the policy in response to the determining.

Example Embodiments

Figure 1:
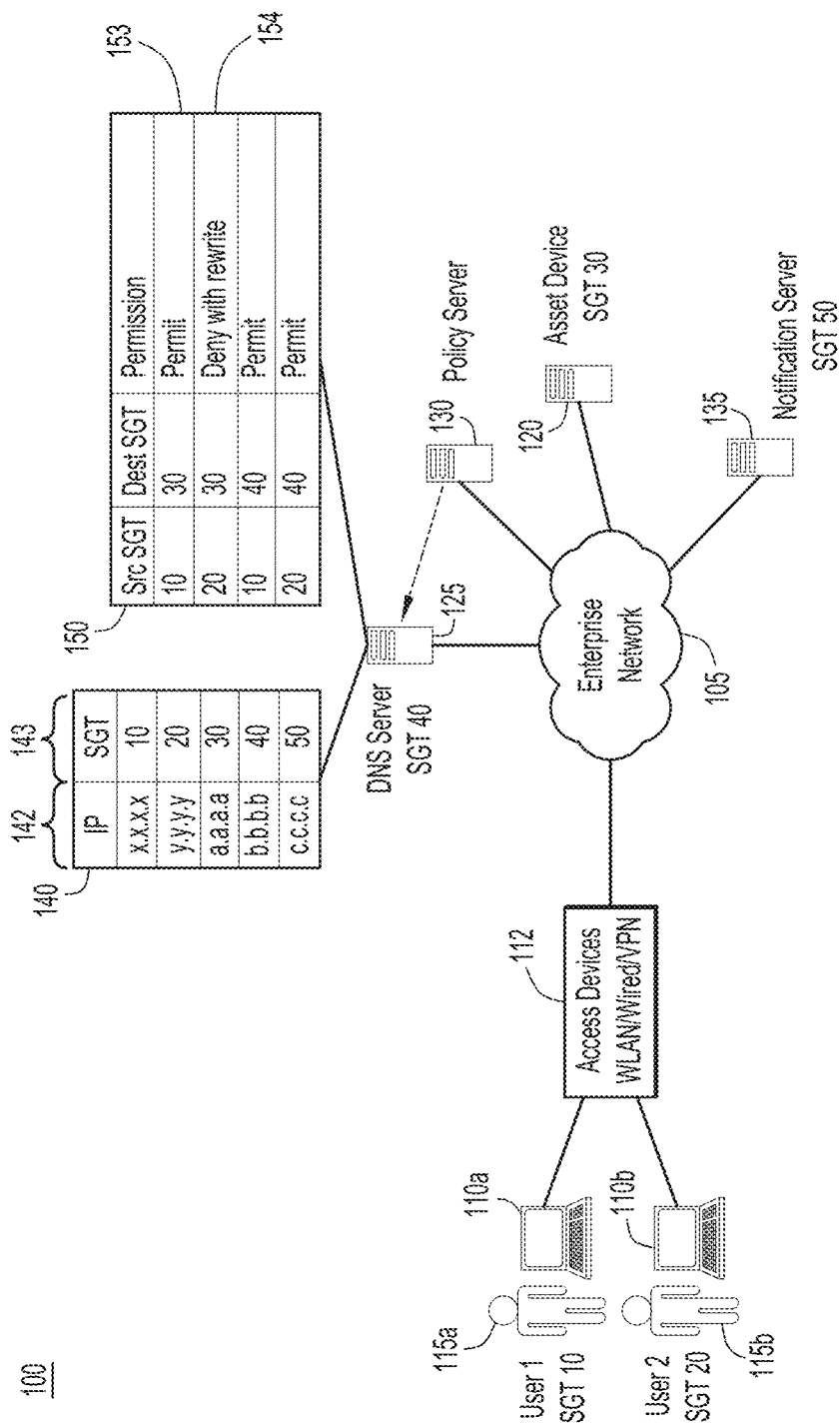
FIG. 1 is an illustration of a network environment configured to implement role-based policy DNS response techniques, according to an example embodiment.

With reference made to FIG. 1, depicted therein is network environment 100, which according to the specific example embodiment of FIG. 1, includes an enterprise network 105. User devices 110*a* and 110*b*, which are utilized by users 115*a* and 115*b*, respectively, are configured to access asset device 120 via network access device 112 and enterprise network 105. As used herein, an "enterprise network" refers to a network domain under administrative control of a distinct entity or enterprise. For example, a user may access a network environment through a public access point, such as a Wi-Fi® access point, using a virtual private network (VPN). The access point would not be part of the enterprise network. Yet, through the use of the VPN the user puts themselves within the enterprise network via the logical extension provided by the VPN. This is not to say that Wi-Fi access points are always not part of enterprise networks. Instead, a Wi-Fi access point at the enterprise physical location would be part of the enterprise network because such an access point is part of the administrative domain of the enterprise network. According to example embodiments, network access device 112 may provide access to a Wireless Local Area Network (WLAN), a wired Local Area Network (LAN) or a VPN.

Asset device 120 may be embodied as a server device that will respond to requests from user devices 110*a* and 110*b*. According to the example embodiment of FIG. 1, asset device 120 is a protected asset, which for the purposes of the present disclosure indicates that asset device 120 may be accessed only by devices associated with users who have rights sufficient to access asset device 120. The requests to which asset device 120 responds may be Domain Name System (DNS) requests, Transmission Control Protocol (TCP) requests, User Datagram Protocol (UDP) requests, and others known to the skilled artisan.

Also included in network environment 100 are DNS server 125, policy server 130 and notification server 135. According to the specific example embodiment of FIG. 1, DNS server 125 may be embodied as an OpenDNS® or Cisco® Cloud Umbrella® server. Policy server 130 may be embodied as a device that operates according to the context sharing techniques discussed in the Internet Engineering Taskforce (IETF) Request for Comments (RFC) 8600, entitled "Using Extensible Messaging and Presence Protocol (XMPP) for Security Information Exchange," the contents of which are incorporated herein by reference. According to specific example embodiments, policy server 130 may be embodied as a Cisco Identity Services Engine (ISE) server, a RADIUS server, or another authentication, authorization and/or accounting server known to the skilled artisan. While server devices 120, 125, 130 and 135 and user devices 110*a* and 110*b* are illustrated as separate physical devices, they may be embodied as virtualized devices (including virtual machines and container applications) that reside on one or more shared physical devices.

As understood by the skilled artisan, a DNS server, such as DNS server 125 is used to translate domain names into Internet Protocol (IP) addresses. A policy server, such as policy server 130, determines access policies for users and user devices. For example, policy server 130 may determine which of user devices 110*a* and 110*b* and/or users 115*a* and 115*b* are permitted to access asset device 120. Policy server 130 may determine policies which provide policy decisions based on a role associated with the users 115a/115b of user devices 110a/110b. The example of FIG. 1 implements Security Group Tag (SGT), Destination Group Tag (DGT), and Security Group Access Control List (SGACL) decisions. The skilled artisan will understand that other types of policy decisions may be implemented without deviating from the techniques of the present disclosure.

According to related art techniques, user device 110a may send a DNS request containing the domain name of asset device 120 to DNS server 125. If implementing related art techniques, DNS server 125 would respond to the DNS request with an IP address for asset device 120 regardless of whether or not the policies determined by policy server 130 grant user device 110a (or user 115a) access to asset device 120. User device 110a would then generate a request for asset device 120 using the IP address received from DNS server 125. The policies determined by policy server 130 are implemented via a security device (not illustrated) arranged within enterprise network 105. For example, the router or switch closest to asset device 120 may implement the policies determined by policy server 130. Furthermore, user device 110a, as well as user 115a, may not be notified of application of the policy. Therefore, if the policy denies user device 110a access to asset device 120, user 115a may not be aware that user device 110a was purposefully denied access to asset device 120. User 115a may continue attempting to access asset device 120, seek support, or become dissatisfied with his or her user experience.

DNS Response Policy Zones (RPZ) implemented in related art techniques may be configured to block malicious DNS requests at DNS server 125, but these related art techniques may not tie the decision to block the requests back to the network for notification. Related art DNS servers may also not be configured to make initial RPZ decisions based on identity/device attribute-based access control. Instead, the decisions may be based on threat-based functions as determined by machine learning or artificial intelligence.

According to the techniques of the present disclosure, attribute-based decisions may be made in accordance with policies set by a policy server and incorporate the attributes available to the policy server that include (but are not limited to) device/user identity, device posture, device/user threat assessment, management status, device type, and others known to the skilled artisan. The policy server attribute-based decision may result in an SGT and corresponding SGT/DGT/SGACL decision that is applied by a DNS server. Where related art techniques may apply the SGACL decision for a drop subsequent to a DNS request and silently from the user's perspective without feedback to the user, the techniques of the present disclosure may include a notification to the user as described in greater detail below.

Therefore, according to the techniques of the present disclosure, DNS server 125 is configured to implement role-based policies. For example, policy server 130 may populate DNS server 125 with policies to implement concurrent or prior to providing responses to DNS requests. According to other example embodiments, DNS server 125 and policy server 130 may be implemented through the same physical or virtual device. Also according to the techniques of the present disclosure is the use of notification server 135. Notification server 135 may be utilized to notify user devices 110a and 110b, as well as users 115a and 115b, when access is being denied to asset device 120 in response to a policy. Such notifications may improve the user experience and avoid unnecessary support requests.

In order to implement the techniques of the present disclosure, DNS server 125 is configured with role data 140 and policy data 150. Role data 140 includes mappings of identifying information (IP addresses in this example) and classification results (SGTs in this example) performed by policy server 130. Policy data 150 includes enterprise network security policies. The skilled artisan understands that other types of identifying information (e.g., Media Access Control (MAC) addresses) and classification results may be used without deviating from the techniques of the present disclosure. The enterprise network security policies are often expressed as dynamic source classifications (via policy server 130 and/or a Software Defined Network (SDN) controller) along with static classifications (DNS names or static objects, such as static IP addresses). These policies may include a notification keyword to indicate to DNS server 125 that it should change the response for a particular network security policy.

Using this data, DNS server 125 may implement policies that would have been implemented elsewhere using related art techniques. By implementing the policies at DNS server 125, efficiency within network environment 100 may be improved and the experience of users 115a and 115b may also be improved.

For example, user 115a may send a DNS request to DNS server 125 via user device 110a. Included in the request will be the domain name associated with asset device 120, as well as the IP address for user device 110a, "x.x.x.x." Based upon the IP address for user device 110a, DNS server 125 determines a role for the user associated with user device 110a using role data 140. According to the example embodiment of FIG. 1, the role data 140 comprises a combination of an IP address, which is contained in column 142, and an SGT, which is contained in column 143. In other words, role data 140 includes IP address to SGT mappings that are configured as a table of source classifications and destination classifications in the form of IP address/SGT bindings.

DNS server 125 determines the SGT for user device 110a from its IP address of "x.x.x.x." As illustrated in role data 140, the role associated with the IP address of "x.x.x.x" is the SGT of "10." DNS server 125 also determines the IP address for asset device 120 based upon the domain name contained in the request. Specifically, DNS server 125, by its nature, has the requested IP address for asset device 120 or finds it via normal resolution. As indicated in FIG. 1, asset device 120 has an IP address of "a.a.a.a" which is associated with the SGT of "30" in role data 140. DNS server 125 then determines the policy to apply to the DNS request in policy data 150 using the SGT of user device 110a ("10") and the SGT of asset device 120 ("30").

DNS server 125 will use the enterprise network security policy contained in policy data 150 to determine how to respond to the DNS resolution request from user device 110a. For example, policies may include "SGT 10 communicating to Domain Name cisco.box.com is permitted" and "SGT 20 communicating to Domain Name cisco.box.com is denied." DNS server 125 may then evaluate whether or not the source IP address, mapped back to the SGT, requesting the domain name resolution is allowed to communicate with the domain name in question.

As indicated in policy data 150, the policy contained in row 153 that is associated with SGT "10" and SGT "30" indicates that devices having an SGT of "10" are permitted to access devices with an SGT of "30." Accordingly, DNS server 125 will respond to user device 110a with the IP address for asset device 120, "a.a.a.a," via a DNS reply message. User device 110a will, in turn, send a message addressed to "a.a.a.a" for access to asset device 120.

On the other hand, when user 115b sends a DNS request to DNS server 125 via user device 110b, DNS server 125 will deny user device 110b access to asset device 120, and reroute user device 110b to notification server 135 so that user 115b may be notified that it has been denied access to asset device 120 in accordance with network policies. Specifically, DNS server 125 will receive a DNS request from user device 110b requesting the IP address of asset device 120. Contained in the DNS request is the source IP address of "y.y.y.y," which is the IP address of user device 110b. Based on the domain name of asset device 120, which is contained in the DNS request, DNS server 125 determines the IP address of "a.a.a.a" for asset device 120. Utilizing these two IP addresses, DNS server 125 is able to retrieve the roles associated with user device 110a and asset device 120 from roles data 140, which are the SGTs of "20" and "30," respectively. Based on these SGTs, DNS server 125 may locate in policy data 150 the policy associated with SGTs "20" and "30," which is a "deny and rewrite" policy, as indicated in row 154 of policy data 150. In response to this determination, DNS server 125 will respond to user device 110b, not with the IP address of asset device 120, but with an IP address of "c.c.c.c," the IP address of notification server 135.

In other words, DNS server 125 may use the DNS response to change the DNS resolution from the normal resolved IP address to an IP address of an application server (e.g., notification server 135) hosting application notifications that may be used for user notification. Notification server 135 may be configured to provide notifications through a number of different protocols, including Hypertext Transfer Protocol (HTTP), Remote Desktop Protocol (RDP), Secure Shell (SSH) communications, and others known to the skilled artisan. The techniques of the present disclosure leverage a DNS resolution request that violates enterprise network security policy to point a user device (e.g., user device 110b) to a web page that communicates to the user that they are denied access to specific resources due to enterprise network security policy.

According to specific example embodiments, the DNS response provided by DNS server 125 may include additional information (e.g., packet metadata or other data) that may be utilized by one or more of user devices 110a/110b or notification server 135. For example, information included in the DNS response may be utilized by an Extension Mechanism for DNS (EDNS) resolver executing on user device 110b. The EDNS resolver may utilize this additional information to interact with the operating system executing on user device 110b. Through this interaction with the operating system, user 115b may be notified of the application of the network policy, or the operating system may log the execution of the network policy in a system log. Additionally, because the EDNS resolver may use the additional information to interact with the operating system, the notification and logging may be implemented without requiring additional software to be installed on user device 110b.

Upon receipt of the DNS response, user device 110b will send a request, not to asset device 120, but to notification server 135. Notification server 135 will then respond thereto with a message indicating that user device 110b is being denied access to asset device 120 in accordance with network policies. The message may include Hypertext Mark-up Language (HTML) that is interpreted by user device 110b as a webpage that will display the notification to user 115b. Because user 115b has been notified that its access has been denied purposefully, the experience of user 115b may be improved. While user 115b may disagree with the policy application, user 115b will not erroneously determine that his or her inability to access asset device 120 was the result of network errors or outages.

User device 110b may include additional information in the request sent to notification server 135 in response to the DNS response. For example, the EDNS resolver executing on user device 110b may include the additional information (e.g., metadata) received from DNS server 125 in the request or generate its own additional information that may be used by notification server 135 to tailor the notification webpage displayed to user 115b. For example, notification server 135 may generate the webpage based on one or more of the specific user of user device 110b, the specific policy the application of which resulted in the notification, or other information known to the skilled artisan. According to one specific example, if user device 110b was denied access to asset device 120 because it was running a non-compliant operating system, notification server 135 may use this additional information received in the request to generate a webpage that will display to the user the steps to remedy the conditions that caused user device 110b to be denied access to asset device 120. The web page may display the particular operating system version to which user device 110b should be upgraded to permit access to asset device 120.

Furthermore, the redirection of user device 110b to notification server 135 may improve performance. Absent the techniques of the present disclosure, a request sent from user device 110b to asset device 120 may error out at the network device that would otherwise apply the deny policy to the request. For example, the network device applying the policy may simply drop the packets associated with the request sent from user device 110b to asset device 120. Before the request errors out, numerous alternate attempts may be made my user device 110b and/or relatively significant time may pass before user 115b realizes that the request will not be responded to by asset device 120. Through the techniques of the present disclosure, notification server 135 may provide timely responses to user device 110b, decreasing the amount of time between the request made by user device 110b and the determination by user 115b that asset device 120 will not be responding to the request.

Based on an analysis of a large sample of current web-based technologies, a large number of the applications that originate from user devices, such as user devices 110a and 110b, utilize DNS resolution services. Accordingly, the techniques of the present disclosure, which apply policies at a DNS server such as DNS server 125, may be particularly effective in providing end users with notifications of enterprise security policy violations and/or constraints. Further, embodiments of the techniques of the present disclosure may be implemented in enterprise domains such that the web server used in the DNS response will be in a user or user device's certificate chain of trust (i.e., the web servers will be managed devices with enterprise certificate trust chains). Accordingly, the web pages being displayed will not suffer from trust issues in web browser sessions. In addition, as the techniques are integrated at the DNS layer, the techniques of the present disclosure may be compatible with regular DNS, DNS over Transmission Control Protocol (TCP), and DNS over Hypertext Transfer Protocol (HTTP).

Furthermore, the underlying policies may still be enforced should users or devices obtain IP address information for services directly. For example, if user device 110b is aware of the IP address of asset device 120 independent from DNS server 125, and user device 110b sends a request directly to asset device 120 without first requesting DNS translation from DNS server 125, network devices (including network access device 112) may still be configured with policies that will deny user device 110b access to asset device 120.

Additionally, the application of the above-described techniques may be dependent on the type of user who is making the DNS request to DNS server 125. For example, administrators may configure DNS server 125 such that enterprise users are notified of the application of the network policy through the DNS rewrite that redirects the user's traffic to notification server 135. For other users, such as contract or guest users, DNS server 125 may be configured such that the techniques of the present disclosure are not applied to the user's traffic, and the traffic associated with these users would be dropped silently to prevent the users from gaining information regarding the types of network policies implemented in the network environment. Enterprise users may be distinguished from contract and guest users through the SGT values associated with the users.

According to the example described above with reference to FIG. 1, DNS server 125 provides a response that redirects user device 110b to notification server 135. In other example embodiments, the response from DNS server 125 may redirect user device 110b to other types of devices, such as a proxy device or a server configured to provide software updates to user device 110b. Such redirects may serve to self-remedy the conditions that caused user device 110b to be denied access to asset device 120.

For example, the response sent from DNS server 125 may redirect user device 110b to a proxy device. The proxy device may act as a transparent pass through to asset device 120 while allowing enterprise administrators to capture all data sent from user device 110b to asset device 120. The proxy device would permit the enterprise administrators to capture more data in a more passive way than related art techniques. The proxy device may also serve as a "honeypot" where suspected attacks are slowed down, rending the attack useless.

In other specific example embodiments, the response from DNS server 125 may redirect user device 110b to a server configured to update the software, such as the operating system executing on user device 110b, in order to remedy the condition that resulted in user device 110b being denied access to asset device 120.

Figure 2:
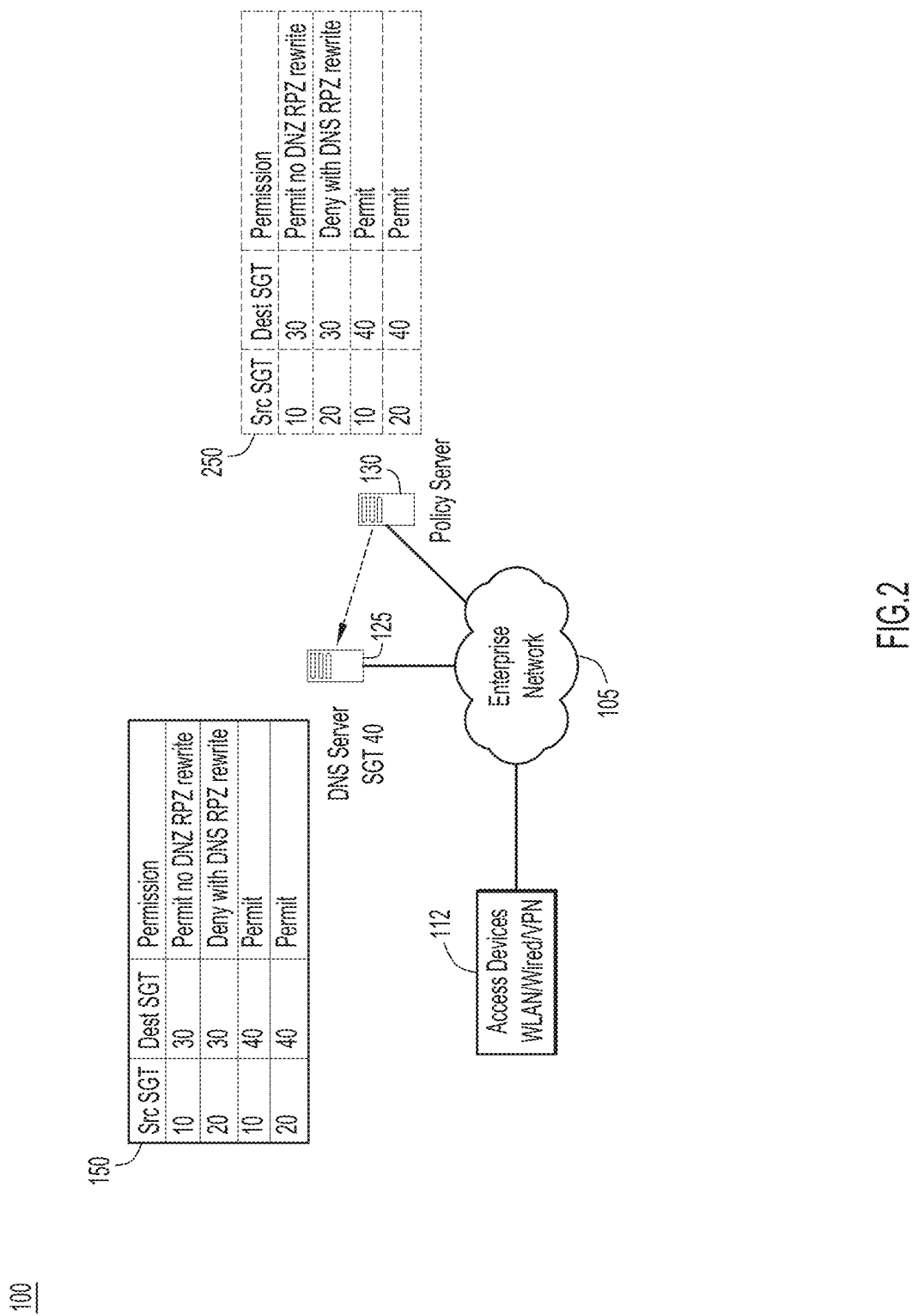
FIG. 2 is an illustration of a process flow for populating a DNS server with policy data used to implement role-based policy DNS response techniques, according to an example embodiment.

With reference now made to FIG. 2, depicted therein is a process flow by which DNS server 125 is populated with policy data 150. As illustrated in FIG. 2, policy data 250 is initially stored at policy server 130. According to the techniques of the present disclosure, enterprise network 105 may establish a context sharing relationship between policy server 130 and DNS server 125, which facilitates the sharing of policy data 250 to DNS server 125, where it will be stored as policy data 150.

Figure 3:
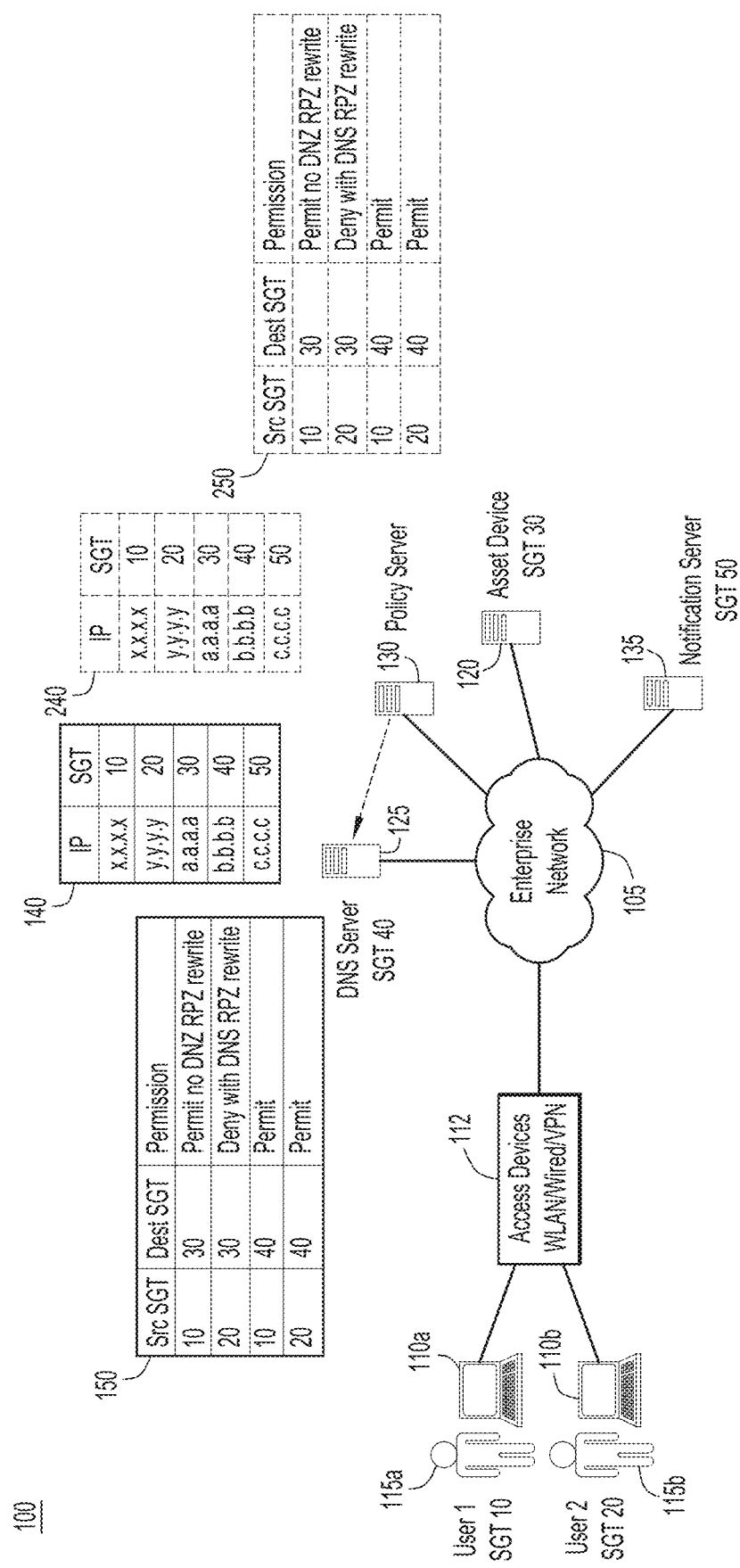
FIG. 3 is an illustration of a process flow for populating a DNS server with role data used to implement role-based policy DNS response techniques, according to an example embodiment.

With reference now made to FIG. 3, depicted therein is a process flow by which DNS server 125 is populated with role data 140. As shown in FIG. 3, as devices authenticate to enterprise network 105, role data 240 is generated at policy server 130. At the time illustrated in FIG. 3, five devices in addition to policy server 130 have authenticated to enterprise network 105: DNS server 125, asset device 120, notification server 135, and user devices 110a and 110b. Accordingly, policy server 130 generates role data 240 that creates a binding between the IP addresses associated with these devices and their roles, which are embodied as SGTs in the example of FIG. 3. Policy server 130 transmits messages to DNS server 125 that contain data indicative of role data 240, which facilitates the creation and storage of role data 140 at DNS server 125.

Figure 4:
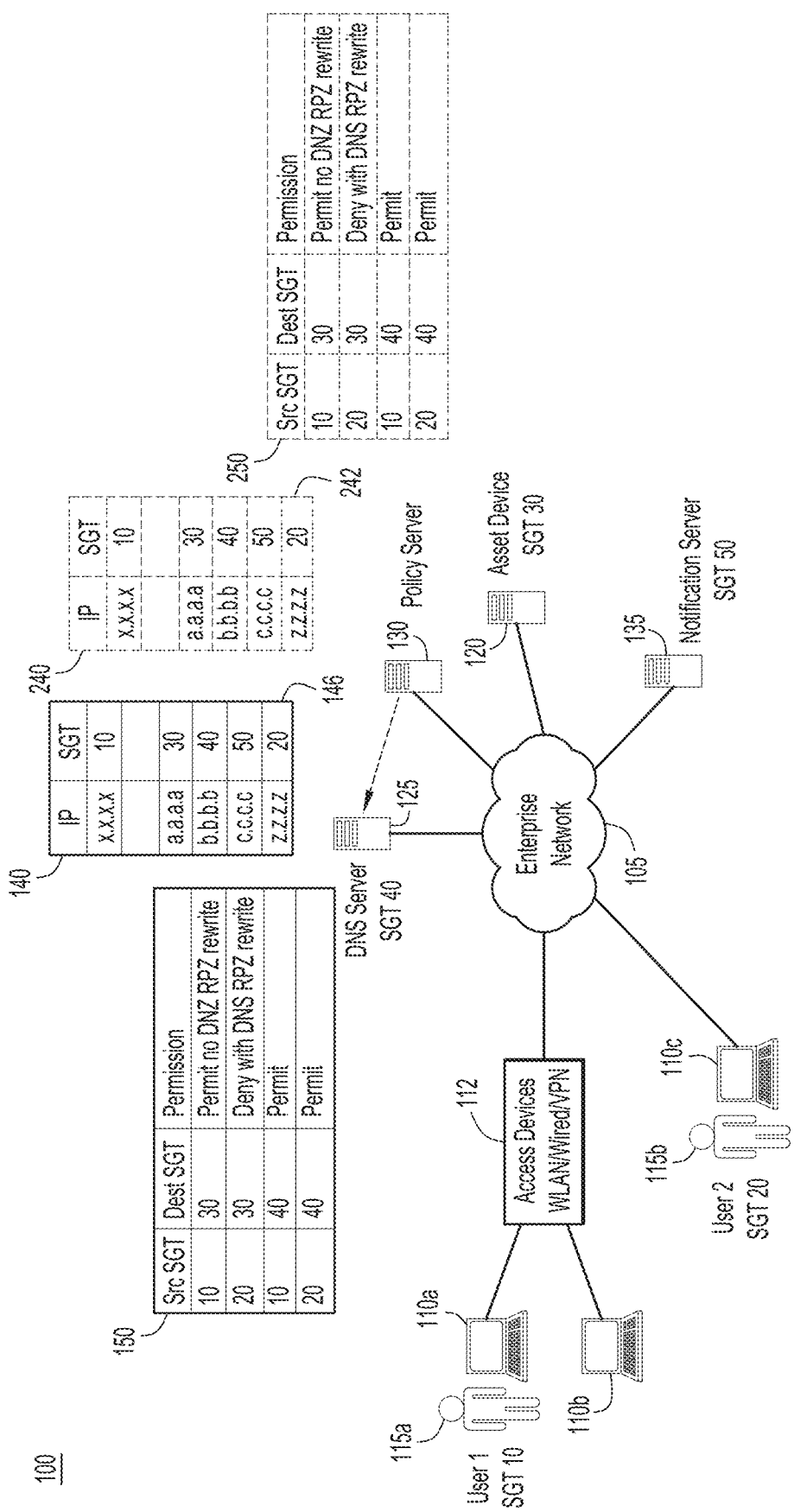
FIG. 4 is an illustration of a process flow for updating role data used to implement role-based policy DNS response techniques, according to an example embodiment.

With reference now made to FIG. 4, depicted therein is an illustration of how the role-based techniques of the present disclosure prevent users from circumventing the application of policies by the DNS server 125 by accessing enterprise network 105 from a different device. As shown in FIG. 4, user 115b accesses enterprise network 105 through a third user device 110c. As part of the authentication process, the role data 240 maintained by policy server 130 is updated to reflect the authentication of user device 110b via user device 110c. As shown in row 242 of role data 240, a binding is created between the role (i.e., SGT "20") for user 115b and the IP address for its new user device 110c (i.e., IP address "z.z.z.z"). This update to role data 240 is automatically transmitted to DNS server 125 as illustrated in row 146 of role data 140. Accordingly, even though user 115b is now accessing enterprise network 105 through a new device with a new IP address, when a DNS resolution request is made to DNS server 125, the role associated with user 115b will be correctly determined by DNS server 125, and DNS server 125 may deny user device 110c access to asset device 120.

Figure 5:
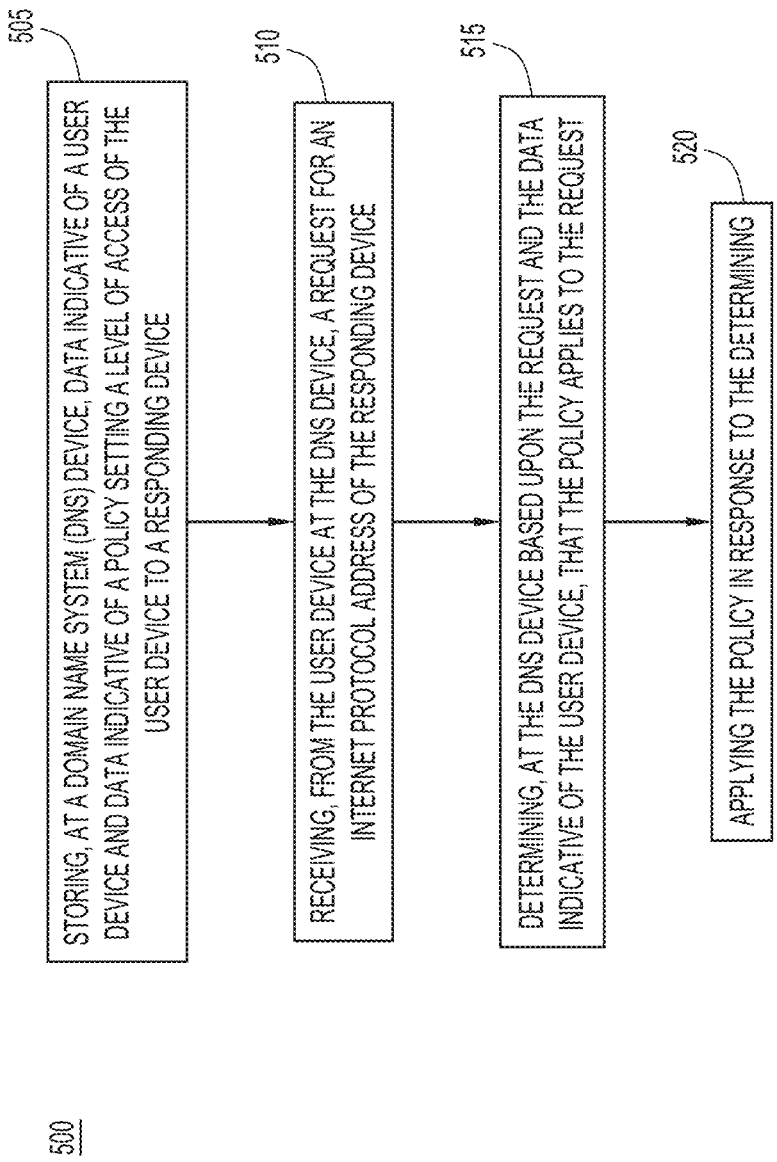
FIG. 5 is a flowchart illustrating a first process flow for providing role-based policy DNS response techniques, according to an example embodiment.

With reference now made to FIG. 5, depicted therein is a flowchart 500 illustrating a process for implementing the techniques of the present disclosure, according to example embodiments. Flowchart 500 begins in operation 505 in which a DNS device stores data indicative of a user device and data indicative of a policy setting a level of access of the user device to a responding device. According to specific example embodiments of operation 505, the DNS device may be embodied as a DNS server, such as DNS server 125, the data indicative of the user device may be embodied as role data 140, and the data indicative of the policy setting the level of access of the user device to the responding device may be embodied as the policy data 150, as illustrated in FIGS. 1-4.

In operation 510, the DNS device receives a request for an IP address of the responding device. According to specific examples, operation 510 may be embodied as a DNS request made from user device 110a or user device 110b to DNS server 125 as described above with reference to FIG. 1. In operation 515, the DNS device determines, based upon the request and the data indicative of the user device, that the policy applies to the request. Using FIG. 1 as an example, operation 515 may be embodied as the determination by DNS server 125 that user device 110b should be denied access to asset device 120. DNS server 125 determines that a policy exists in policy data 150 based upon, for example, the source IP address for user device 110b contained in the DNS request, the DNS name contained in the DNS request, and role data 140 (which is an example of data indicative of the user device). More specifically, DNS server 125 first determines the SGT for user device 110b based on its IP address and role data 140. DNS server 125 then determines the SGT for asset device 120 by translating the DNS name in the request to an IP address, and finding the SGT corresponding to the IP address of asset device 120 contained in role data 140. DNS server 125 then determines that a policy is contained in policy data 150 that applies to requests made from devices with the SGT associated with user device 110b and the SGT associated with asset device 120. Operation 515 may also be embodied as the determination of a policy in policy data 150 that applies to DNS requests made by user device 110a for asset device 120.

Finally, in operation 520, the policy is applied in response to the determining performed in operation 515. For example, operation 520 may be embodied as DNS server 125 of FIG.

1 sending a DNS response to user device 110b that provides user device 110b with the IP address for notification server 135 instead of the IP address for asset device 120. Operation 520 may also be embodied as DNS server 125 of FIG. 1 sending a DNS response to user device 110a that provides user device 110a with the IP address for asset device 120. Operation 520 may also be embodied as DNS server 125 of FIG. 1 sending a DNS response to user device 110b with the IP address for a proxy device or a server configured to update the software on user device 110b, as described above. The process flow of flowchart 500 may include additional operations, such as the generation of the data indicative of the user device and the data indicative of the policy, as described above with reference to FIGS. 2-4, and as described below with reference to FIG. 6.

Figure 6:
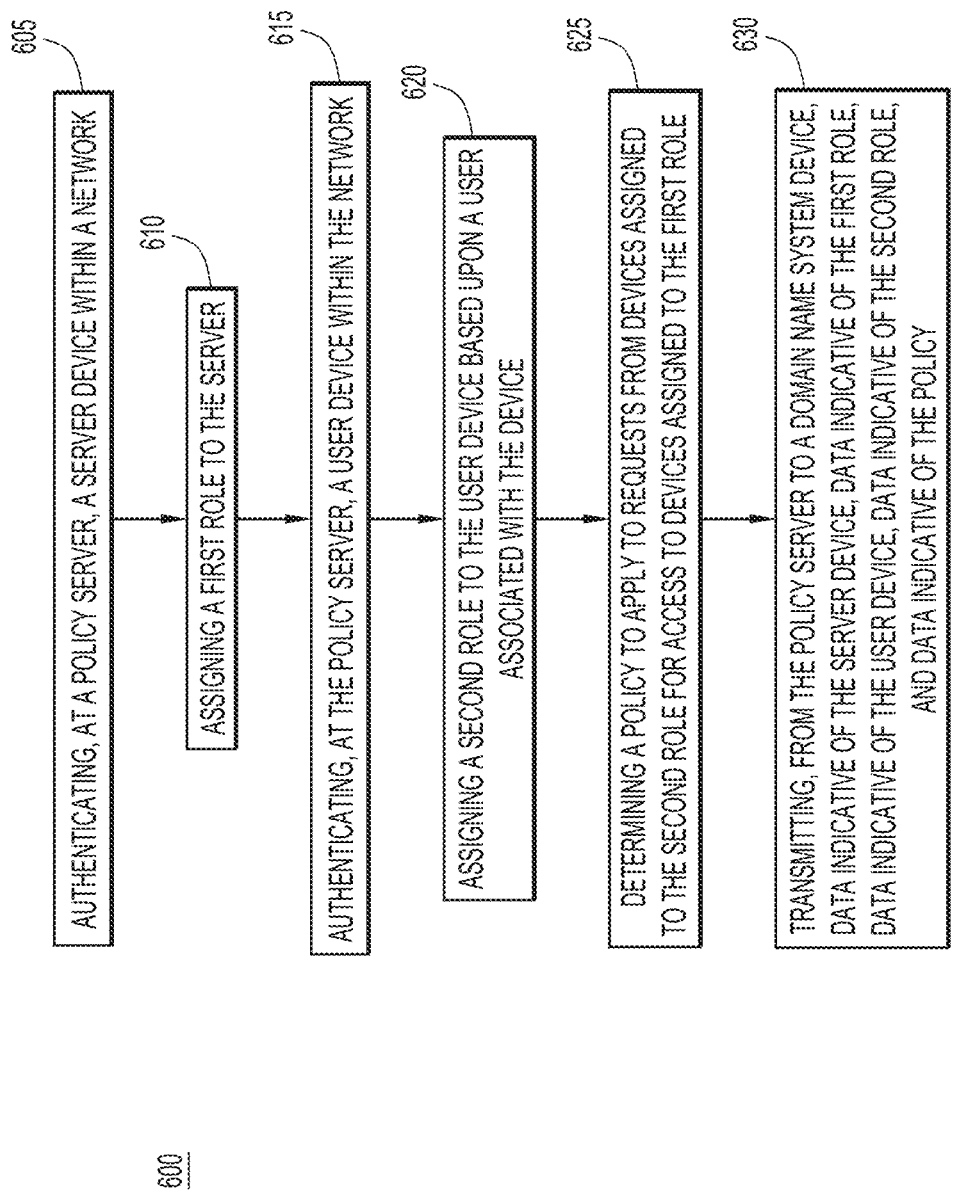
FIG. 6 is a flowchart illustrating a second process flow for providing role-based policy DNS response techniques, according to an example embodiment.

With reference now made to FIG. 6, depicted therein is a flowchart 600 illustrating a process flow for populating a DNS device, such as DNS server 125, with policy and role data, as illustrated in FIGS. 2-4. In operation 605, a policy server authenticates a server device within a network. The policy server also assigns the server device a first role in operation 610. Examples of operations 605 and 610 may be embodied as the authentication of asset device 120 within enterprise network 105, and the assignment of SGT "30" to asset device 120, as illustrated in FIG. 3.

In operation 615, the policy server authenticates a user device within the network, and in operation 620, the policy server assigns the user device a second role based on the user of the user device. Examples of operations 615 and 620 may be embodied as the authentication of one or more of user devices 110a and 110b within enterprise network 105, and the assignment of SGTs "10" and "20" to user devices 110a and 110b, respectively, as illustrated in FIG. 3.

In operation 625, the policy server determines a policy to apply to requests from devices assigned to the second role for access to devices assigned to the first role. Examples of operation 625 may be embodied as the generation of policy data 250 as illustrated FIG. 2.

Finally, in operation 630, the policy server transmits, to a DNS device, data indicative of the server device, data indicative of the first role, data indicative of the user device, data indicative of the second role, and data indicative of the policy. Examples of operation 630 may be embodied as the transmission of policy data 250 from policy server 130 to DNS server 125 as illustrated in FIG. 2 and the transmission of role data 240 to DNS server 125 as illustrated in FIG. 3. The process flow of flowchart 600 may include additional operations, such as the updating of the data indicative of the user device, as described above with reference to FIG. 4.

Figure 7:
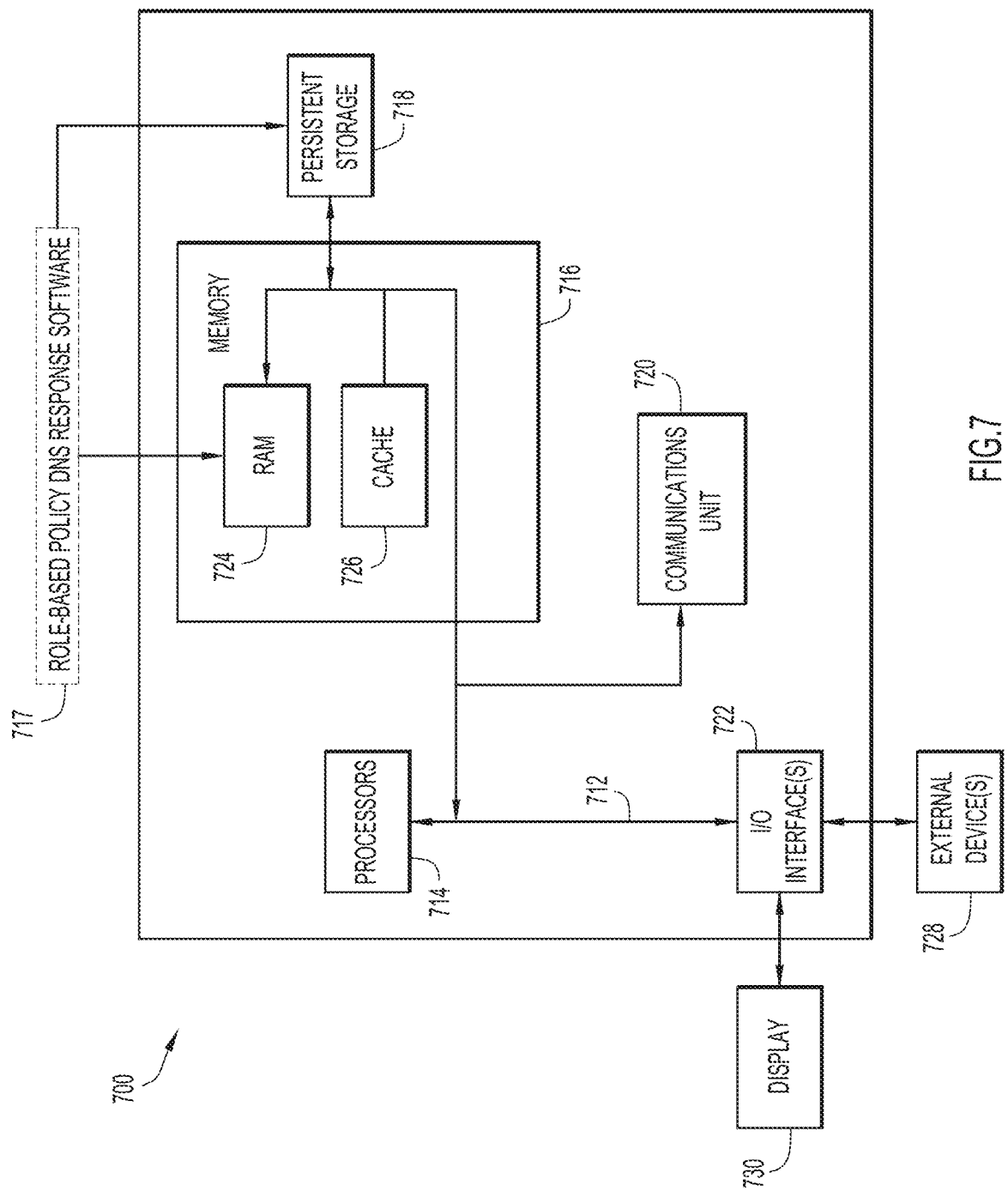
FIG. 7 is a functional block diagram of a device configured to implement role-based policy DNS response techniques, according to an example embodiment.

With reference now made to FIG. 7, depicted therein is a hardware block diagram of a computing device 700 that may perform the functions of any of the servers or computing entities referred to herein in connection with FIGS. 1-6. It should be appreciated that FIG. 7 provides only an illustration of one embodiment and does not imply any limitations with regard to the environments in which different embodiments may be implemented. Many modifications to the depicted environment may be made.

As depicted, the device 700 includes a bus 712, which provides communications between computer processor(s) 714, memory 716, persistent storage 718, communications unit 720, and input/output (I/O) interface(s) 722. Bus 712 can be implemented with any architecture designed for passing data and/or control information between processors (such as microprocessors, communications and network processors, etc.), system memory, peripheral devices, and any other hardware components within a system. For example, bus 712 can be implemented with one or more buses.

Memory 716 and persistent storage 718 are computer readable storage media. In the depicted embodiment, memory 716 includes random access memory (RAM) 724 and cache memory 726. In general, memory 716 can include any suitable volatile or non-volatile computer readable storage media. Instructions for the Role-Based Policy DNS Response Software 717 may be stored in memory 716 or persistent storage 718 for execution by processor(s) 714.

One or more programs may be stored in persistent storage 718 for execution by one or more of the respective computer processors 714 via one or more memories of memory 716. The persistent storage 718 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

Communications unit 720, in these examples, provides for communications with other data processing systems or devices. In these examples, communications unit 720 includes one or more network interface cards. Communications unit 720 may provide communications through the use of either or both physical and wireless communications links.

I/O interface(s) 722 allows for input and output of data with other devices that may be connected to computer device 700. For example, I/O interface 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. Display 730 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, provided for herein are techniques for user notification of security filtering events at the application level (e.g., through a web browser) by using role determination from the network authentication server shared to the DNS server. Through the roles shared with the DNS server, the DNS server may apply role-based policies to determine the appropriate DNS resolution response to give to a user. The techniques described herein may result in a web page notification that the communication from the user to the application has been prohibited by enterprise security policy. The techniques of the present disclosure have no operating or system agent dependencies and the techniques may solve the problem of policy-driven user notification in a generic way that is extensible for current operating environments as well as future network environments. The techniques of the present disclosure provide for the ability to notify end-users as determined by the enterprise policy within the managed enterprise domain of network security policy events, as well as maintaining the network-level enforcement of security policy.

The techniques of the present disclosure provide for methods, that include operations of: storing, at a Domain Name System (DNS) device, data indicative of a user device and data indicative of a policy setting a level of access of the user device to a responding device; receiving, from the user device at the DNS device, a request for an Internet Protocol (IP) address of the responding device; determining, at the DNS device based upon the request and the data indicative of the user device, that the policy applies to the request; and applying the policy in response to the determining.

The techniques of the present disclosure also provide for apparatuses. The apparatuses include: one or more memories; one or more network interfaces; and one or more processors. The one or more processors are configured to: store, in the one or more memories, data indicative of a user device and data indicative of a policy setting a level of access of the user device to a responding device; receive, via the one or more network interfaces from the user device, a request for an Internet Protocol (IP) address of the responding device; determine, based upon the request and the data indicative of the user device, that the policy applies to the request; and apply the policy in response to determining that the policy applies to the request.

In addition to the methods and apparatus, the techniques of the present disclosure provide for tangible, non-transitory computer-readable mediums encoded with instructions. The instructions, when executed by one or more processors, cause the one or more processors to: store, at a Domain Name System (DNS) device, data indicative of a user device and data indicative of a policy setting a level of access of the user device to a responding device; receive, from the user device at the DNS device, a request for an Internet Protocol (IP) address of the responding device; determine, at the DNS device based upon the request and the data indicative of the user device, that the policy applies to the request; and apply the policy in response to determining that the policy applies to the request.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
storing, at a Domain Name System (DNS) device, data indicative of a role associated with a user device and data indicative of a policy setting a level of access of the user device to a responding device, wherein the data indicative of the role associated with the user device indicates a security level for the user device within an enterprise network environment;
obtaining, from the user device at the DNS device, a request for an Internet Protocol (IP) address of the responding device;
determining, at the DNS device based upon the request and the data indicative of the role associated with the user device, that the policy applies to the request; and
applying the policy in response to the determining, wherein applying the policy comprises providing, to the user device, data indicative of an IP address of a notification server to redirect the user device from the responding device to the notification server to provide the user device with an indication of the applying the policy by the DNS device.

2. The method of claim 1, wherein the role associated with the user device is based upon a role associated with a user of the user device.

3. The method of claim 1, wherein the policy sets the level of access of the user device to the responding device based upon the role associated with the user device.

4. The method of claim 1, wherein applying the policy comprises denying the user device access to the responding device.

5. The method of claim 1, further comprising obtaining, at the DNS device, the data indicative of the role associated with the user device from a policy server.

6. The method of claim 1, wherein the policy comprises an enterprise policy.

7. An apparatus comprising:
one or more memories;
one or more network interfaces; and
one or more processors configured to perform operations on behalf of a Domain Name System (DNS) device such that the one or more processors are configured to:
store, in the one or more memories, data indicative of a role associated with a user device and data indicative of a policy setting a level of access of the user device to a responding device, wherein the data indicative of the role associated with the user device indicates a security level for the user device within an enterprise network environment;
obtain, via the one or more network interfaces from the user device, a request for an Internet Protocol (IP) address of the responding device;
determine, based upon the request and the data indicative of the role associated with the user device, that the policy applies to the request; and
apply the policy in response to determining that the policy applies to the request, by providing, to the user device, data indicative of an IP address of a notification server to redirect the user device from the responding device to the notification server to provide the user device with an indication of application of the policy by the DNS device.

8. The apparatus of claim 7, wherein the role associated with the user device is based upon a role associated with a user of the user device.

9. The apparatus of claim 7, wherein the policy sets the level of access of the user device to the responding device based upon the role associated with the user device.

10. One or more tangible non-transitory computer-readable mediums encoded with instructions, wherein the instructions, when executed by one or more processors, cause the one or more processors to:
store, at a Domain Name System (DNS) device, data indicative of a role associated with a user device and data indicative of a policy setting a level of access of the user device to a responding device, wherein the data indicative of the role associated with the user device indicates a security level for the user device within an enterprise network environment;
obtain, from the user device at the DNS device, a request for an Internet Protocol (IP) address of the responding device;
determine, at the DNS device based upon the request and the data indicative of the role associated with the user device, that the policy applies to the request; and
apply the policy in response to determining that the policy applies to the request by providing, to the user device, data indicative of an IP address of a notification server to redirect the user device from the responding device to the notification server to provide the user device with an indication of application of the policy by the DNS device.

11. The one or more tangible non-transitory computer-readable mediums of claim 10, wherein the role associated with the user device is based upon a role associated with a user of the user device.

12. The one or more tangible non-transitory computer-readable mediums of claim 10, wherein the policy sets the level of access of the user device to the responding device based upon the role associated with the user device.

13. The apparatus of claim 7, wherein the one or more processors are configured to apply the policy by denying the user device access to the responding device.

14. The apparatus of claim 7, wherein the one or more processors are configured to obtain the data indicative of the role associated with the user device from a policy server.

15. The one or more tangible non-transitory computer-readable mediums of claim 10, wherein the instructions that apply the policy deny the user device access to the responding device.

16. The one or more tangible non-transitory computer-readable mediums of claim 10, wherein the instructions cause the DNS device to obtain the data indicative of the role associated with the user device from a policy server.

17. The apparatus of claim 7, wherein the policy comprises an enterprise policy.

18. The method of claim 1, wherein the data indicative of the role associated with the user device comprises a security group tag.

19. The apparatus of claim 7, wherein the data indicative of the role associated with the user device comprises a security group tag.

20. The one or more tangible non-transitory computer-readable mediums of claim 10, wherein the data indicative of the role associated with the user device comprises a security group tag.

* * * * *